(12) United States Patent
Lin et al.

(10) Patent No.: US 8,452,935 B2
(45) Date of Patent: May 28, 2013

(54) READ-ONLY MEMORY DEVICE WITH SECURING FUNCTION AND ACCESSING METHOD THEREOF

(75) Inventors: Chuen-An Lin, Hsinchu County (TW); Ching-Tsung Tung, Taipei County (TW)

(73) Assignee: Holtek Semiconductor Inc., Hsinchu (TW)

( * ) Notice: Subject to any disclaimer, the term of this patent is extended or adjusted under 35 U.S.C. 154(b) by 871 days.

(21) Appl. No.: 12/552,014

(22) Filed: Sep. 1, 2009

(65) Prior Publication Data
US 2009/0327593 A1 Dec. 31, 2009

Related U.S. Application Data

(63) Continuation-in-part of application No. 11/757,488, filed on Jun. 4, 2007, now abandoned.

(30) Foreign Application Priority Data

Jan. 19, 2007 (TW) ................................ 96102108 A

(51) Int. Cl.
*G06F 12/00* (2006.01)
(52) U.S. Cl.
USPC ................... 711/163; 711/154; 711/E12.103
(58) Field of Classification Search
None
See application file for complete search history.

(56) References Cited

U.S. PATENT DOCUMENTS

| 4,583,196 A | 4/1986 | Koo |
| 4,724,519 A * | 2/1988 | Barlow et al. ................ 710/122 |
| 5,155,829 A | 10/1992 | Koo |
| 5,699,434 A | 12/1997 | Hogan |
| 6,792,528 B1 | 9/2004 | Hou |
| 6,910,094 B1 | 6/2005 | Eslinger et al. |
| 7,437,532 B1 * | 10/2008 | Chen et al. ................. 711/220 |
| 2003/0061499 A1 * | 3/2003 | Durrant ....................... 713/189 |
| 2004/0236894 A1 * | 11/2004 | Grundy et al. ................ 711/1 |
| 2005/0008150 A1 | 1/2005 | Liang |
| 2006/0031687 A1 | 2/2006 | Su et al. |
| 2007/0061595 A1 * | 3/2007 | Chen ............................ 713/193 |

FOREIGN PATENT DOCUMENTS

| TW | 382872 | 2/2000 |
| TW | 200625167 A | 7/2006 |
| TW | I264210 | 10/2006 |

* cited by examiner

*Primary Examiner* — Reginald Bragdon
*Assistant Examiner* — Arvind Talukdar
(74) *Attorney, Agent, or Firm* — WPAT, PC; Justin King

(57) ABSTRACT

The present invention provides a memory device and a method for accessing the memory device thereof. The memory device comprises an address encoding selector for selecting one of plurality of encoding circuits which encodes a first address into a second address, and a data decoding selector for selecting one of plurality of decoding circuits which decodes a first data corresponding to the second address into a second data and a non-volatile memory, coupled to address encoding selector and the data decoding selector, for storing the first data. The method for accessing the memory device comprises encoding a first address into a second address by an address encoding selector, and decoding a first data corresponding to the second address into a second data by a data decoding selector, wherein the first data being stored in the non-volatile memory.

16 Claims, 6 Drawing Sheets

READ-ONLY MEMORY DEVICE WITH SECURING FUNCTION AND ACCESSING METHOD THEREOF

BACKGROUND OF THE INVENTION

1. Field of the Invention

The present invention relates to a memory device and a method for accessing the memory device thereof, more particularly, to a memory device with high securing function and the accessing method thereof.

2. Description of the Prior Arts

Data, software, computer program or high confidential information stored in the non-volatile memory, for example, read-only memory (ROM), may be stolen easily by some kinds of method. The method usually is so called "Chip De-cap" or "Dump ROM Code". The technology of Chip De-cap comprises removing the package of chip and probing the particular data pins for the data information stored in the memory. The technology of Dump ROM Code comprises issuing an instruction to retrieve binary code via I/O ports and reversing binary code to assembly code by a revering program. Therefore, if the data/address stored in the ROM memory are not encoded, they are easily stolen by the above means.

U.S. Pat. No. 7,171,566 B2 discloses a computer processing apparatus, when writing data to, and/or reading data from, memory, one or more instruction bits are associated with the memory address for the data to specify how encryption or decryption is to be performed. However, the address itself suggested in 566' does not be encoded, let alone for serving the purpose of preventing the technique of Chip De-Cap or Dump ROM Code.

U.S. Publication No. 2007/0061595 discloses an apparatus and a method for protecting data. The apparatus includes a sequential-key comparator and a scrambling device. However, the scrambling device is not for encoding for serving the purpose of preventing the technique of Chip De-Cap or Dump ROM Code. More particularly, the data/address stored in the storage device 250 is not encoded by software, so the data stored in the 250 can be found by De-cap.

Accordingly, in view of the above drawbacks, it is an imperative that a ROM device for practicing secret is designed so as to solve the drawbacks as the foregoing.

SUMMARY OF THE INVENTION

In view of the disadvantages of prior art, the primary object of the present invention is to provide a memory device and a method thereof, for practicing security on data stored in the memory device and the method for retrieving the data.

The primary purpose of the present invention is to protect the data from being copied or stolen by chip De-cap or Dumping ROM code. To serve the purpose, the data stored in the ROM is encoded and the address corresponding to the data is also encoded both by software. To read the correct data from the ROM, the user needs to know the parameters set up by the software and to encoding the address and accordingly decoding the encoded data so as to protect the data from being stolen.

The present invention relates to a device for preventing data stored in the device from being copied or stolen by chip De-cap or Dump ROM code, comprises: an address de-multiplexer, receiving an input address signal and first option signals, and outputting a de-multiplexed address signal, which is the same as the input address signal, based upon the first option signals; a plurality of address encoders, coupled to the address de-multiplexer, for encoding the de-multiplexed address signal; an address multiplexer, coupled to output terminals of the address encoders, receiving the encoded address signals and second option signals, and outputting one of the encoded address signal based upon the second option signals; a non-volatile memory, coupled to the address multiplexer, for storing an accessing address and a data corresponding to the accessing address; wherein the accessing address is previously encoded by software, and the data is correctly accessed only when the accessing address equals to the encoded address signal; and a data decoding selector for decoding the data.

The present invention relates to a method for preventing data stored in the device from being copied or stolen by chip De-cap or Dump ROM code, comprises: receiving a first address from a micro-controller cooperating with the memory; demultiplexing the first address into a demultiplexed address signal by a demultiplexer, which bypasses the first address into a demultiplexed address signal by using the first option signals; encoding the demultiplexed address signal into encoded address signal by a plurality of address encoders; selecting the encoded address signal by a multiplexer having second option signals; and decoding a first data according to the selected one of the encoded address signal into a second data by a data decoding selector; wherein the first data being stored in a non-volatile memory of the memory device, wherein first option signals and second option signals are only known by the manufacturer.

The present invention relates to a computer-readable storage medium carrying instructions for causing a programmable processing apparatus to become operable: (a) to receive a data and an address corresponding to the data, both the data and the address complies with a non-volatile memory compatible format; and (b) to demultiplex the address into an address encoder according to first option signals; and (c) encoding the address into an encoded address signal; and (d) multiplexing the encoded address signal to be a desire address based upon second option signals, wherein the first option signals and the second option signals are only known by the manufacturer.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as follows.

The present invention relates to a method and an apparatus for securing functions for MASK ROM or One-time programming ROM, which relate to a software realization and a hardware realization. In regard to the software, it is for generating (1) A ROM code having its address and its data corresponding to its address are encoded so as to facilitate to be stored in the ROM part of an IC; and (2) There are four critical values, which are referred as addr_option1, addr_option, data_option1 and data_option2, wherein the four critical values are positive integers which are only known by the manufacturer. In regard to the hardware, (1) The four critical values are being treated as constants that are stored in the digital logic area in the IC; (2) In the ROM there are stored the software-encoded ROM codes; (3) The apparatus for practicing secret further comprises an address encoding selector and an data decoding selector.

Figure 1:
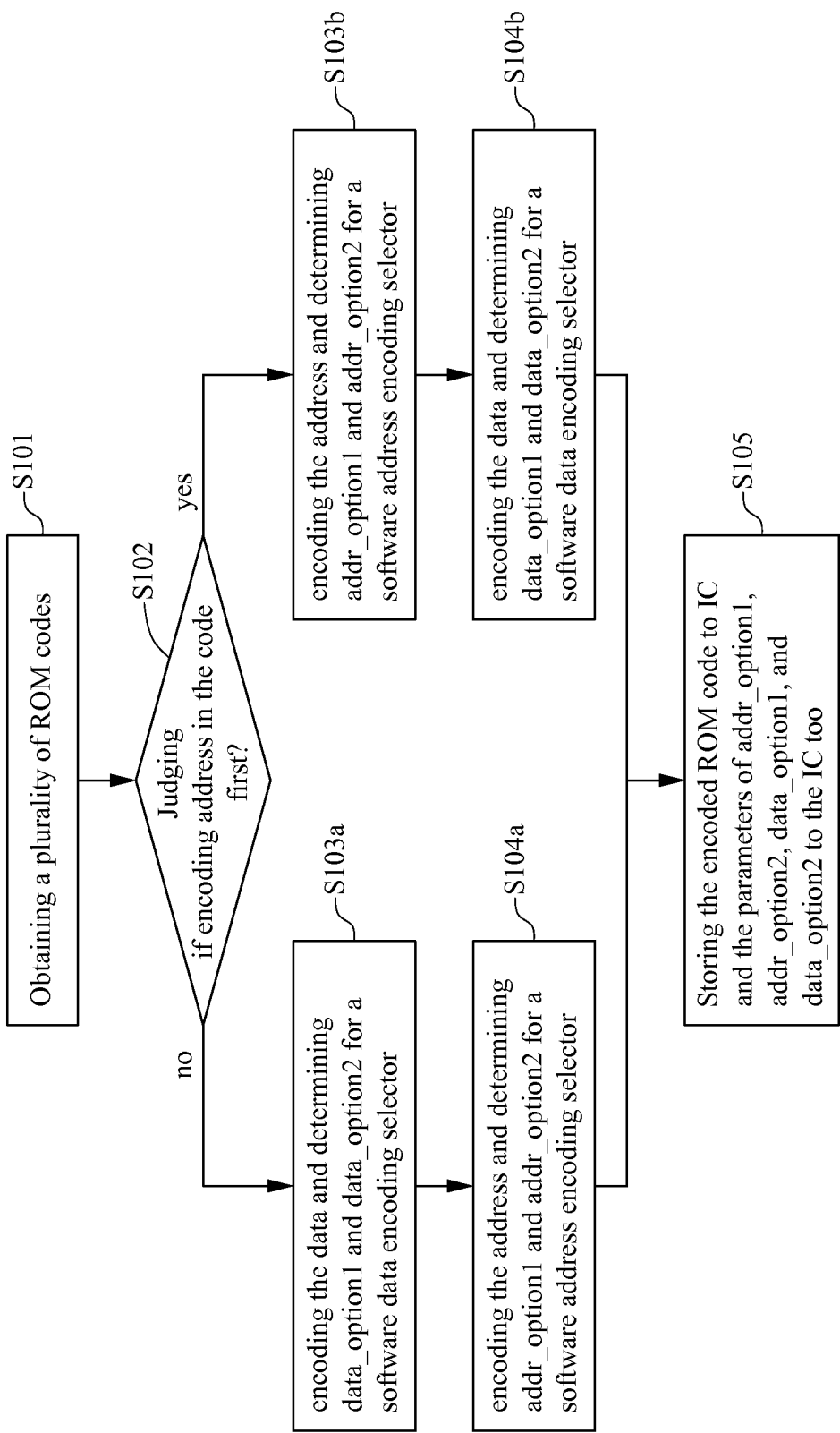
FIG. 1 relates to a flowchart of a preferred embodiment for encoding an address and a data according to the address in software according to the present invention.

Please refer to FIG. 1 now, which illustrates a flow chart in regard to the software development. After the program developer sets up the ROM code, then the ROM code is encoded by the software for both its address and its data corresponding to the address. Since the coding procedures for the address or the data can be processed independently, the address can be coded first or the data can be coded first. Hence, in FIG. 1, a selector characterized in "encoding address first" such that the coding sequence can be illustrated.

In FIG. 1, hereby it illustrates: s101: Obtaining a plurality of ROM codes; s102: Judging if encoding address in the code first? If no, go to s103a; and if yes, go to s103b; s103a: encoding the data and determining data_option1 and data_option2 for a software data encoding selector; s104a: encoding the address and determining addr_option1 and addr_option2 for a software address encoding selector; s103b: encoding the address and determining addr_option1 and addr_option2 for a software address encoding selector; s104b: encoding the data and determining data_option1 and data_option2 for a software address encoding selector; and s105: Storing the encoded ROM code to IC and the parameters of addr_option1, addr_option2, data_option1, and data_option2 to the IC too.

Figure 2:
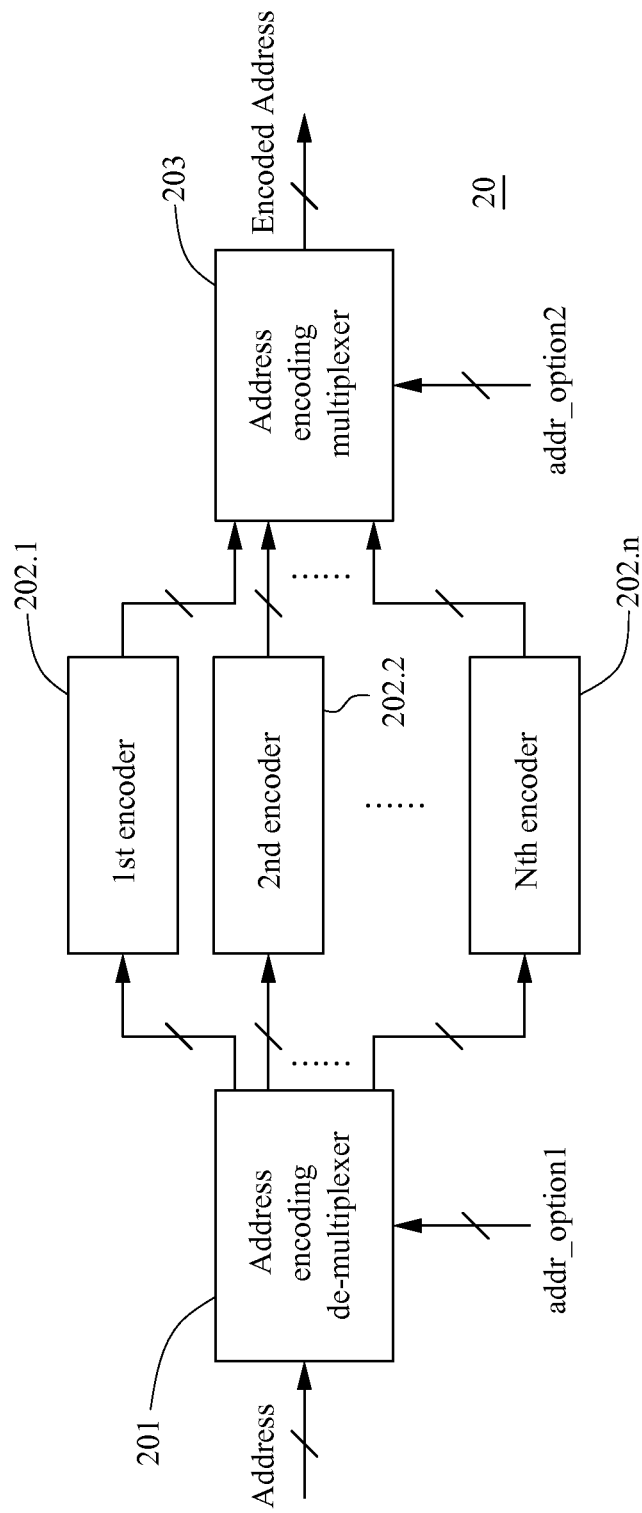
FIG. 2 relates to a view of a software address encoding selector in a preferred embodiment according to the present invention.

To encode the address, the address encoding selector 20 in both software and hardware can be referred as FIG. 2 illustrates. FIG. 2 illustrates encoders 202.1~202.n, where n is a positive integer, and thus the addr_option1 and addr_option2 can be further determined, such that the address can be processed by de-multiplexer(s) 201 and then be forwarded for being coded by one of the encoder 202.1~202.n, and the encoded address signal, after the option of the addr_option2, lets address encoding multiplexer(s) 203 to give the encoded address. And the encoders 202.1~202.n can be determined upon IC model, IC manufacturing date, ROM code developers and the like, which are not limited thereto. Meanwhile, the parameters addr_option1 and addr_option2 provide correct information of an accurate path for encoding. And, within the plurality of address encoders 202.1~202.n, if utilizing fake encoders, at least one of them is a real encoder, and the rest of them are fake encoders, and if not utilizing fake encoders, all of them are real encoders.

Figure 3:
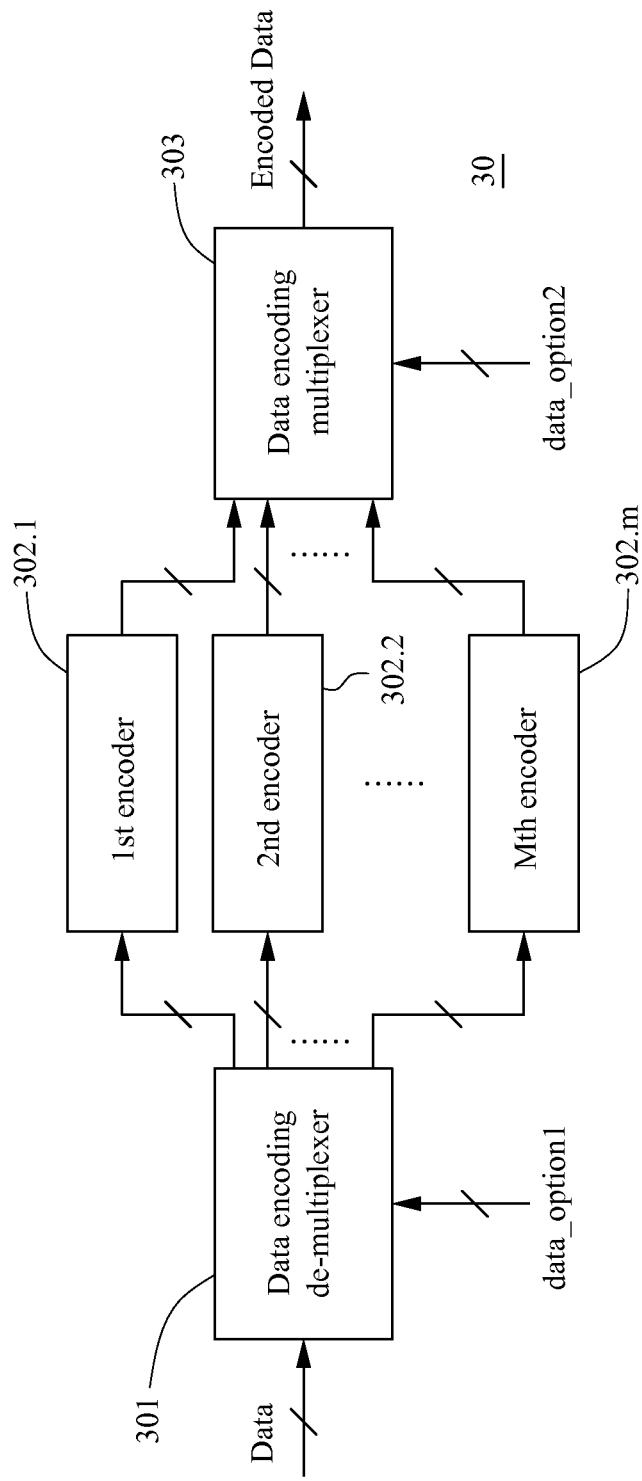
FIG. 3 relates to a view of a software data encoding selector in a preferred embodiment according to the present invention.

For further understanding the method for encoding the data, FIG. 3, illustrates a data encoding selector 30, where encoders 302.1~302.m, and the data_option1 and data_option are determined so as to enact the data be processed by demultiplexer(s) 301 and then be encoded by one of the encoders 302.1~302.m determined by the data_option1, and the output is passed to the encoded data by the data encoding multiplexer 303 with data_option2. That is, the combination of data_option1 and data_option selects one of the encoders 302.1~302.m to process encoding the data. And the encoders 302.1~302.m can be determined upon IC model, IC manufacturing date, ROM code developers and the like, which are not limited thereto. This information is only known by the manufacturer.

Finally, the encoded ROM codes with both addresses and data been encoded are stored in the ROM area of the IC. And addr_option1, addr_option2, data_option1, and data_option2 are treated as constants that are distributed in the digital logic area of the IC such that the complexities for decoding the ROM codes are enhanced.

Figure 4:
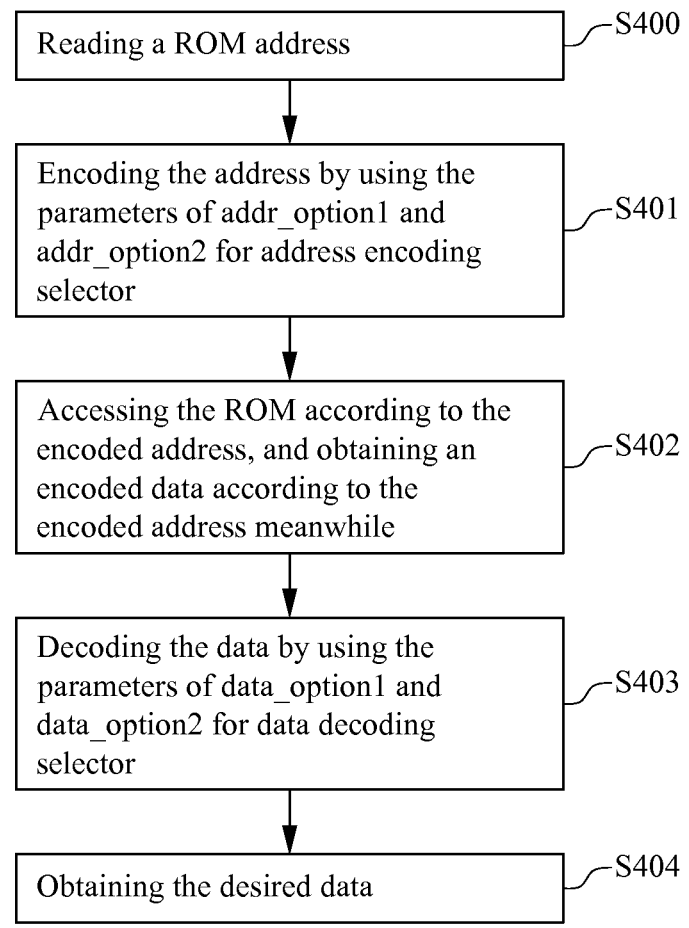
FIG. 4 relates to a flowchart of how to retrieve the address and the data from the ROM memory device where encoded data stored thereon according to the present invention.

FIG. 4 illustrates a flowchart how a desired data corresponding to a designated address can be obtained. In FIG. 4, there are 5 steps as follows: s400: Reading a ROM address; s401: Encoding the address by using the parameters of addr_option1 and addr_option for address encoding selector; s402: Accessing the ROM according to the encoded address, and obtaining an encoded data according to the encoded address meanwhile; s403: Decoding the data by using the parameters of data_option1 and data_option for data decoding selector; s404: Obtaining the desired data.

In the s400, the IC with the ROM built thereon or cooperating with the ROM will send out desired ROM address. However, the desired ROM address does not correspond to a desired ROM data since both the address and data are encoded, hence, the acquired data according to the desired ROM address without encoding/decoding, is faulty.

What noteworthy is, in s401, the encoder recited in the address encoding selector can only be correctly accessed by knowing the constants of addr_option1 and addr_option2, and the encoder here is identical to the encoder in the software means but it's realized by hardware.

What noteworthy is, in s403, the decoder recited in the data decoding selector can only be correctly accessed by knowing the constants of data_option1 and data_option2, and the decoder here is reciprocal to the encoder in the software means and it's realized by hardware.

Figure 5:
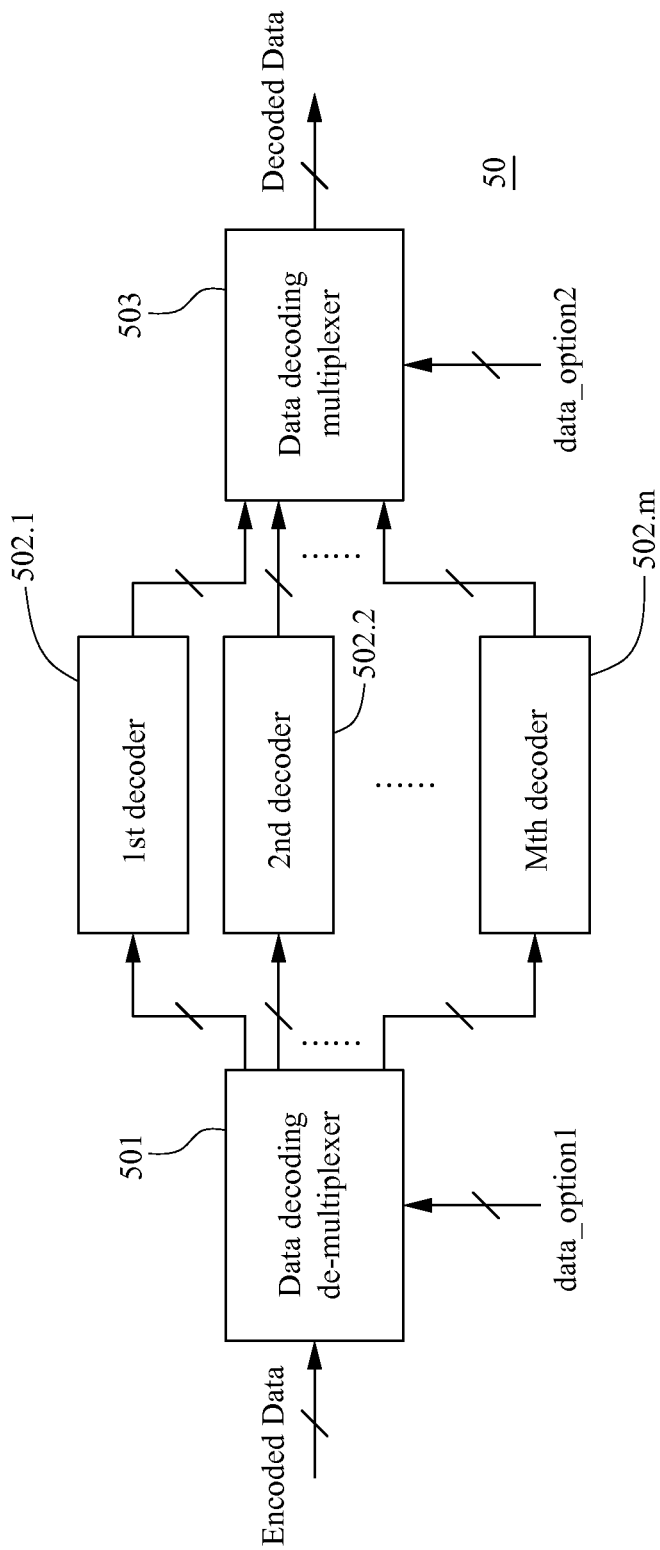
FIG. 5 relates to a schematic view of the data decoding selector of a preferred embodiment according to the present invention.

FIG. 5 illustrates the data decoding selector 50, which is implemented on hardware or on the chip disclosed in the present invention. The data decoding selector 50 comprises a data decoding de-multiplexer 501, a first~Mth decoder 502.1~502.m, and a data decoding multiplexer 503. The 501 receives the encoded data according to the encoded address, and then 501's output which is identical to encoded data, is decoded by the specified one of 502.1~502.m decoder chosen by data_option1, and again selected by the 503. Only if the parameters of data_option1 and data_option2 are correctly chosen, the decoded data, which is desired, can be obtained. The parameters "data_option1" and "data_option2" in either FIG. 3 and FIG. 5 are reciprocal, which means, the data is encoded by software encoder 30 and then the same data is decoded by the hardware decoder 50, as long as the address in FIG. 2 is correctly accessed and at the same time "data_option1" and "data_option2" are provided for deciphering the 50. Alternatively, FIG. 5 demonstrates a hardware decoding means decoding the data which is encoded by the software encoder shown in FIG. 3. Meanwhile, within the 502.1~502.m, there are at least one real decoder and the rest of them are fake decoders, where m is a positive integer.

Preferably, values of the addr_option1, addr_option, data_option1 and data_option are stored in registers or metal options in IC.

Figure 6:
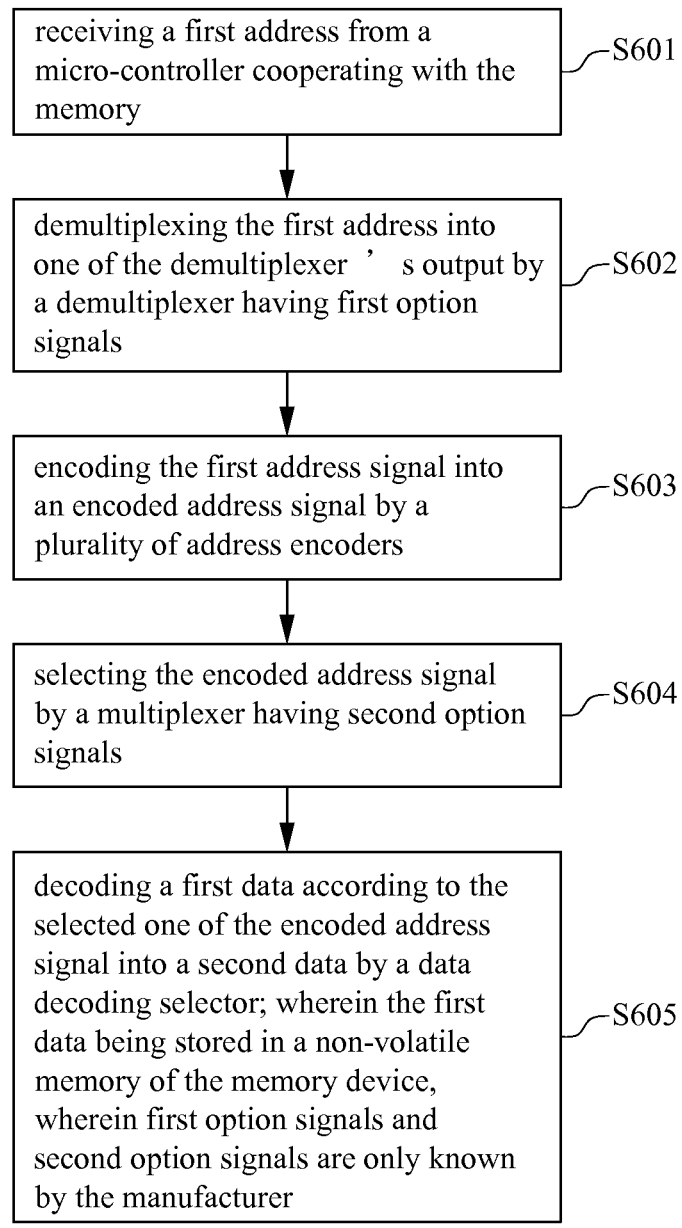
FIG. 6 relates to a flowchart in regard to prevent data in a memory from being copied or stolen by chip De-cap or Dump ROM.

FIG. 6 relates to a method of preventing data in a memory from being copied or stolen by chip De-cap or Dump ROM code, said data is correctly accessed according a corresponding address, comprises steps of: s601: receiving a first address from a micro-controller cooperating with the memory; s602: demultiplexing the first address into one of the demultiplexer's output by a demultiplexer having first option signals; s603: encoding the first address signal into an encoded address signal by a plurality of address encoders; s604: selecting the encoded address signal by a multiplexer having second option signals; and s605: decoding a first data according to the selected one of the encoded address signal into a second data by a data decoding selector; wherein the first data being stored in a non-volatile memory of the memory device, wherein first option signals and second option signals are only known by the manufacturer.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for preventing data stored in the device from being copied or stolen by chip De-cap or Dump ROM code, comprising:
    an address de-multiplexer, receiving an input address signal and first option signals, and outputting a de-multiplexed address signal based upon the first option signals;
    a plurality of address encoders, coupled to the address de-multiplexer, for encoding the de-multiplexed address signal generating encoded address signals;
    an address multiplexer, coupled to output terminals of the plurality of address encoders, receiving the encoded address signals and second option signals, and outputting one encoded address signal of the encoded address signals based upon the second option signals;
    a non-volatile memory, coupled to the address multiplexer, for storing an accessing address and a data corresponding to the accessing address; wherein the accessing address is previously encoded by software, and the data is correctly accessed only when the accessing address equals to the encoded address signal; and
    a data decoding selector for decoding the data;
    wherein the first option signals and the second option signals are designated by and only known by a manufacturer of the device, respectively correspond to a specific critical value, and the critical value is a positive integer.

2. The memory device as recited in claim 1, wherein values of the first option signals and the second option signals are both stored in registers or metal options in IC.

3. The memory device as recited in claim 1, wherein within the plurality of address encoders, at least one of them is a real encoder, and the rest of them are fake encoders.

4. The memory device as recited in claim 1, wherein the non-volatile memory is selected from a group consisting of a mask programmable ROM, a mask ROM, an EEPROM, an EPROM, and a flash ROM.

5. The memory device as recited in claim 1, wherein the data decoding selector further comprises at least one real decoder and a plurality of fake decoders.

6. The memory device as recited in claim 1, wherein the data decoding selector further comprises a data decoding multiplexer having third option signals and a data decoding de-multiplexer having fourth option signals.

7. The memory device as recited in claim 6, wherein values of the third option signals and fourth option signals are both stored in registers or metal options in IC.

8. The memory device as recited in claim 1, wherein the encoders are determined upon IC model, IC manufacturing date, or ROM code developers.

9. The memory device as recited in claim 1, wherein the data corresponding to the address are previously encoded by software.

10. The memory device as recited in claim 1, wherein the device is built on a single chip.

11. A method of preventing data in a memory from being copied or stolen by chip De-cap or Dump ROM code, said data is correctly accessed according a corresponding address, comprising:
    receiving a first address from a micro-controller cooperating with the memory;
    demultiplexing the first address into one of the demultiplexer's output by a demultiplexer having first option signals;
    encoding the first address signal into a plurality of encoded address signals by a plurality of address encoders;
    selecting an encoded address signal of the encoded address signals by a multiplexer having second option signals and outputting the encoded address signal based upon the second option signals; and
    decoding a first data according to the selected one of the encoded address signal into a second data by a data decoding selector; wherein the first data being stored in a non-volatile memory of the memory device, wherein first option signals and second option signals are designated by and only known by a manufacturer who enters data into the memory;
    wherein the first option signals and the second option signals respectively correspond to a critical value, and the critical value is a positive integer.

12. The method as recited in claim 11, wherein the non-volatile memory is selected from a group consisting of a mask programmable ROM, a mask ROM, an EEPROM, an EPROM, and a flash ROM.

13. The method as recited in claim 11, wherein said data decoding selector further comprises at least one real decoder and a plurality of fake decoders.

14. The method as recited in claim 11, wherein said data decoding selector further comprises a data decoding multiplexer having third option signals and a data decoding de-multiplexer having fourth option signals.

15. A non-transitory computer-readable storage medium carrying instructions for causing a programmable processing apparatus to become operable:

(a) to receive a data and an address corresponding to the data, both the data and the address complies with a non-volatile memory compatible format; and
(b) to demultiplex the address into one of the demultiplexer's output according to first option signals; and
(c) encoding the first address into an encoded address signal; and
(d) multiplexing the encoded address signal and selecting the encoded address signal to be a desired address based upon second option signals, wherein the first option signals and the second option signals are designated by and only known by a manufacturer of the non-transitory computer readable storage medium;
wherein the first option signals and the second option signals respectively correspond to a critical value, and the critical value is a positive integer.

16. A non-transitory computer-readable storage medium according to claim 15, wherein the instructions further comprise instructions for causing a programmable processing apparatus to become operable:
(e) to receive a data and an address corresponding to the data, both the data and the address complies with a non-volatile memory compatible format; and
(f) to demultiplex the data according to third option signals; and
(g) encoding the demultiplexed data into an encoded data signal; and
(h) selecting the encoded data signal to be a desire data based upon fourth option signals.

* * * * *